July 16, 1968     C. C. PERRY     3,392,584
CONTINUOUS TIME-OTHER PHYSICAL VARIABLE INDICATING DEVICE
Filed March 30, 1966
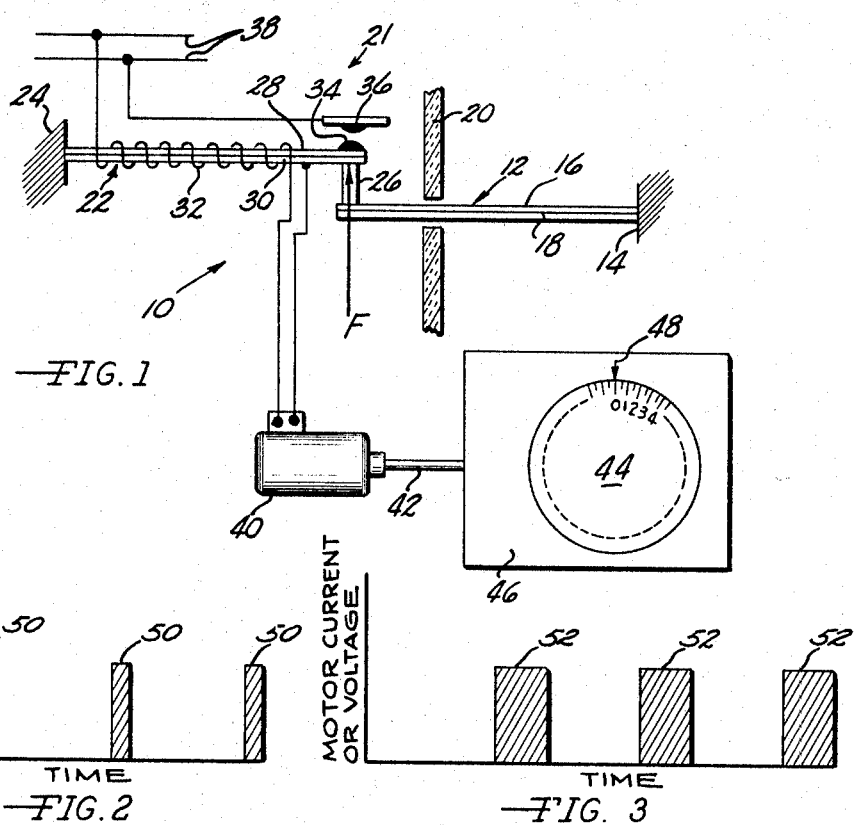
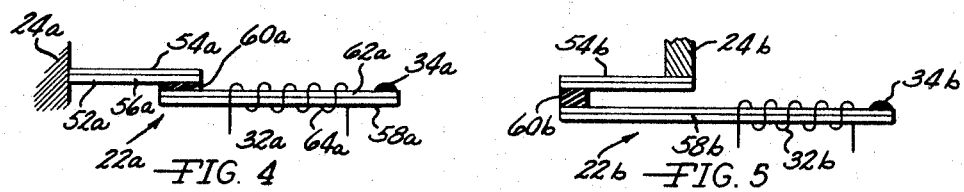
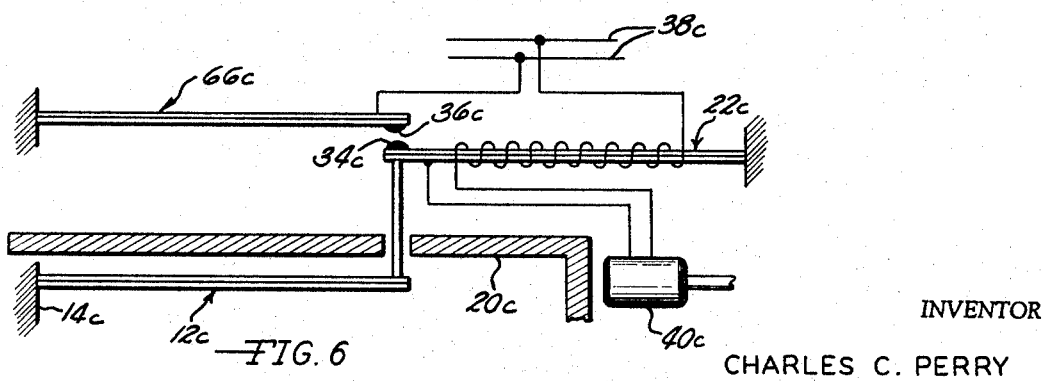
INVENTOR
CHARLES C. PERRY
BY Olsen and Stephenson
ATTORNEYS

United States Patent Office 3,392,584
Patented July 16, 1968

3,392,584
CONTINUOUS TIME-OTHER PHYSICAL VARIABLE INDICATING DEVICE
Charles C. Perry, Ann Arbor, Mich., assignor to W. M. Chace Company, Detroit, Mich., a corporation of Delaware
Filed Mar. 30, 1966, Ser. No. 538,835
6 Claims. (Cl. 73—339)

ABSTRACT OF THE DISCLOSURE

A degree-day meter having a bimetal element responsive to changes in temperature and second bimetal element thermally isolated from the first element. An electric heater energized by the closing of a switch which is actuated by movement of the bimetal elements causes the second element to deflect into equilibrium and break the switch contact thus de-energizing the heater. Telemetric means are provided to indicate the time the heater is energized.

The present invention relates to apparatus for indicating or recording data relating to physical variables, such as ambient temperature or humidity, pressure, force, acceleration, and the like. In the form of the invention described herein, the invention is directed to apparatus for continuous indication or recording of the integral, $\int T dt$, where T is temperature and $t$ is time, so as to provide a "degree-day" meter which may be used to determine when fuel oil tanks supplying heating systems should be refilled, but it is to be understood that the basic concept involved in this invention is not limited in its application.

To facilitate the explanation of the present invention, it is illustrated herein in the form of a "degree-day" meter. It is a common practice in the business of supplying fuel oil for heating purposes, for the supplier to operate on a "keep-fill" basis wherein it is his responsibility to keep the fuel oil tanks of his customers filled without receiving express orders from such customers each time that the tanks require filling. Under these circumstances, to avoid unnecessary trips to his customers, he must ascertain the normal customer needs and then fill the tanks according to his schedule. While he can determine to some extent the general needs of his customers, based on the prior history of use, the quantity of fuel used is also dependent upon the variable outdoor temperature conditions in the region where his customers are located.

It is an object of the present invention to provide apparatus for obtaining and recording data relating to physical variables, and in one specific embodiment of the invention to provide such apparatus which can supply a reasonably accurate record of the cumulative effect of variable outdoor temperature conditions, as such conditions will affect the quantity of fuel oil used for heating purposes.

It is still another object of the present invention to provide apparatus of the foregoing character which is constructed and arranged to meter the "degree-days" that occur with respect to a reference temperature.

According to this invention, there is provided an indicator comprising first means responsive to a physical variable for exerting a force of a magnitude that is a function of the extent of variation of said ambient physical variable from a reference level, a second means operably connected to said first means for exerting a force in opposition to the force exerted by said first means and responsive to a source of energy for increasing the magnitude of its opposition force, an energy supply circuit adapted to be closed in response to a resultant force of a pre-established value exerted by said first and second means and operable when closed to supply energy to said second means to reduce the magnitude of the resultant force at a rate which is proportional to the time the circuit is closed so as to open the circuit after a time duration which is proportional to the force exerted by said first means, and means to measure continuously the time duration when said energy supply circuit is closed.

Where the indicator is of the character discussed above, wherein the variable condition indicated or recorded is ambient temperature, the indicator comprises a first thermostatic bimetal element adapted to undergo flexure in response to temperature, a second ambient compensated thermostatic bimetal element which is in a location thermally isolated from said first element and mounted to undergo flexure in response to temperature changes caused by energizing an associated electric heater, the movable portions of the first and second elements being operatively connected together, a movable first electric contact which is operatively connected to the movable portions of said first and second elements, a second electric contact which is adapted to be engaged by the movable contact, a source of electric power that is electrically connected in series with said electric heater and the first and second contacts and is adapted to energize said heater when said contacts are closed, said first and second bimetal elements being arranged so that lowering of said ambient temperature increases the flexure of the first element toward said stationary contact, and raising of the temperature of said second element by said heater increases the flexure of said second element away from said stationary contact, and telemetric means which are provided in the series circuit with the source of electric power for continuously indicating the time that the series circuit has been closed. In this form of the invention ambient temperature compensation of the second bimetal element, if required, can be accomplished by a number of conventional means which are well known in the art.

Where the indicator is to be of a character for indicating or recording other variables, it will be necessary to make certain changes in the first means or bimetal element discussed above. Thus, if it is desired to record data relating to ambient humidity conditions, an element for sensing humidity conditions, such as is shown in copending application Ser. No. 404,221, filed Oct. 16, 1964 may be employed. It will be recognized by those skilled in the art that other conditions can be sensed by an element corresponding to the first means described above, and such element may be used as a part of the present invention.

Other objects of this invention will appear in the following description and appended claims, reference being had to the accompanying drawings forming a part of this specification wherein like reference characters designate corresponding parts in the several views.

In the drawings:

FIGURE 1 is a schematic view illustrating one embodiment of the present invention;

FIGURE 2 is a graph to which reference is made in explaining the operation of the present invention;

FIGURE 3 is a graph similar to that of FIG. 2 to which reference will also be made in connection with explaining the present invention;

FIGURE 4 is a fragmentary view illustrating a modified form of the thermally isolated element of FIG. 1, arranged to compensate for ambient temperatures;

FIGURE 5 is a fragmentary view of another modified form of the thermally isolated element of FIG. 1; and FIGURE 6 is another modified form of the invention illustrated in FIG. 1, wherein ambient temperature compensation of the thermally isolated element is obtained.

Before explaining the present invention in detail, it is to be understood that the invention is capable of other embodiments and of being practiced or carried out in various ways. It is also to be understood that the phraseology or terminology employed herein is for the purpose of description and not of limitation.

Referring to the drawings, the invention will now be described in greater detail, and initially the embodiment of the invention shown in FIG. 1 will be described. As there shown, an indicator 10 responds to a variable force F which can be transmitted in suitable manner from any one of a number of physical variables. In the illustrated embodiment of the invention, the force F is created by a thermostatic bimetal element 12 mounted for flexure on a structure 14, which can be stationary or adjustable and is located in the environment in which the variable temperature conditions are to be indicated or recorded. The bimetal element 12 is constructed and arranged so that its upper laminate 16 has a relatively higher coefficient of thermal expansion than its lower laminate 18. Generally thermally isolated from the environment of the bimetal element 12, by means of an insulating wall 20, is an assembly 21 comprising a thermal bimetal element 22 which is mounted on the stationary structure 24 for flexure in response to temperature changes. The bimetal element 22 is connected by an insulated linkage 26 to the bimetal element 12 and has an upper laminate 28 which has a relatively higher coefficient of thermal expansion than the lower laminate 30. The bimetal element 22 carries an electric heater 32 and a movable electrical contact 34, which is positioned opposite the stationary electrical contact 36 for engagement therewith. Electrically in circuit with the heater 32 and the contacts 34 and 36 is a power source 38, preferably alternating current, and a synchronous electric motor 40. The heater 32 and the motor 40 can be connected in series, as illustrated, or in parallel, as desired, depending on the relative loads. The shaft 42 of electric motor 40 is connected to the indicator disc 44 by means of a suitable speed reducer (not shown) within the indicator unit 46. By virtue of this arrangement, rotation of the disc 44 relative to the stationary point 48 will indicate the cumulative time that the series circuit containing the electric motor 40 has been energized.

In normal operation, the indicator 10 will operate to indicate or record continuously the integral $\int T dt$, where T is the temperature of the environment in which element 12 is located and $t$ represents time. This particular indicator is especially suited for use as a "degree-day" meter.

In describing the operation of the indicator 10, it will be assumed that a reference temperature has been established with respect to which the "degree-day" is to be measured. Assuming now that the temperature in this environment is slightly above the reference temperature, and in this condition, bimetal element 12 has a position such that it exerts no force on the insulated linkage 26, and contacts 34 and 36 are therefore separated, preventing the flow of current to the heater 32 and a motor 40. As the temperature drops below the reference temperature, bimetal element 12 begins to deflect upward, exerting sufficient force F on the element 22 through the linkage 26 to close the contacts 34 and 36. When these contacts close, the electric motor 40 commences to rotate the indicating disc 44, and, at the same time, the heater 32 begins to increase the temperature of bimetal element 22. After a short time interval, the bimetal element 22 responds sufficiently to the thermal output of the heater to deflect downward, opposing the action of bimetal element 12 and opening the contacts 34 and 36. The heater 32 and electric motor 40 are now de-energized, and the bimetal element 22 begins to cool. As element 22 cools and relaxes towards its initial position, the force F from element 12 through linkage 26 is again sufficient to close the contacts 34 and 36 and start the cycle over again. The series of events described above will be repeated indefinitely as long as the temperature sensed by element 12 remains constant at some value below the reference temperature. FIG. 2 is a graph of the voltage or current applied to the motor as a function of time, and the shaded areas 50 represent graphically the integral $\int T dt$ for the assumed temperature condition. It is to be understood that the time duration of closing of contacts 34 and 36 is short compared to time variations in force F, so that an accurate integral is obtained.

If, now, the temperature sensed by bimetal element 12 becomes still lower with respect to the reference temperature, bimetal element 12 has a greater tendency to deflect upward and exerts a correspondingly greater force on linkage 26 to deflect bimetal element 22 and hold the contacts 34 and 36 closed. As a result of this greater closing force, the electric heater 32 must be energized for a longer time in order to create sufficient counter force in element 22 to overcome the force exerted by element 12 and thereby to open the contacts 34 and 36. As before, this cycle is repeated indefinitely for a constant temperature in the environment surrounding element 12. The motor voltage or current for this condition can be graphed as shown in FIG. 3. As there shown, the shaded areas 52 represent graphically the integral $\int T dt$ for the newly assumed temperature condition.

From the foregoing description it will be understood that the arrangement described is such that the fraction of time during which the motor 40 is rotating increases with the extent to which the environmental temperature surrounding element 12 is below the reference temperature. Since the motor 40, while it is running, operates at constant speed, and since the fraction of time the motor runs is substantially proportional to the deviation from the reference temperature, the total rotation of the disc 44 at any time is proportional to $\int T dt$. In the illustrated embodiment of FIG. 1, the surface of the disc 44 is calibrated in "degree-days" starting from zero. In use, one can note that the difference in "degree-days" over the time interval of interest, or he can, at the beginning of the interval, set the disc to read zero. The disc 44 is driven from the motor 40 through a speed reducer (not shown) with a reduction ratio such that a clearly readable increment of rotation of the indicating disc 44 will correspond to the least desired reading in "degree-days." Capability for recording very large values of the integral $\int T dt$ compared to the least reading is achieved by providing for multiple revolutions of the disc and recording these with a revolutions counter.

Normally, the bimetal element 22 will be located in an environment which is thermally isolated from the environment of bimetal element 12 and in an environment of uniform temperature so that no problems are created by virtue of changes of the ambient temperature of element 22. Thus, normally it will be in an ambient compensated status. However, ambient temperature compensation of bimetal element 22 can be accomplished readily by any of a number of conventional means, including a reversed element with a thermally insulated spacer such as shown in FIG. 4. As there shown, the modified element 22a is mounted for flexure on the stationary member 24a. In this embodiment, a reverse element 52a is provided which has its upper laminate 54a made from a material having a relatively lower coefficient of expansion than the lower laminate 56a. The reverse element 52a is connected to element 58a by an insulation member 60a. The element 58a has laminates 62a and 64a with the upper laminate having a relatively higher coefficient of thermal expansion than the lower laminate, and the element 58a carries the heater 32a and the movable contact 34a. The elements 52a and 58a are properly proportional so that the flexure of each for a given ambient temperature condition offsets that of the other so that no movement of movable contact 34a occurs merely as a result of changes in such ambient temperature condition. Thus, flexure of contact 34a will occur only as a result of heating element 58a by energizing heater 32a.

The embodiment of FIG. 5 functions in essentially the same manner as that of FIG. 4, but here the element 22b is U-shaped in configuration. Corresponding reference numbers have been applied to the parts, and further description of this embodiment is believed unnecessary.

In FIG. 6 is illustrated still another embodiment wherein the "fixed" contact 36c is mounted on a bimetal element 66c and the latter is proportioned to compensate for any flexure of element 22c resulting merely from ambient temperature in the environment of element 22c. In other respects this embodiment need not be described except to point out that reference numbers have been added corresponding to numbers found in FIG. 1.

From the above description, it is to be understood that the total rotation of the disc 44 at any time is proportional to the force applied through linkage 26 to bimetal element 22. As a result, the indicator 10 will record the time integral of any physical variable, such as pressure, acceleration, magnetic field strength, viscosity, humidity, and the like, which can be converted to the force F. The indicator 10 is useful in any situation in which payment is to be made for a total quantity or some action must be taken as a result of a total quantity. For example, the indicator 10 can be used to measure a total flow of fluid by using the pressure differential created in an inferential flow meter to apply the force F. Also, indicator 10 can be used as a watt-hour meter in which the force F is created by a member which responds to a flow of current through the meter.

In a commercial form of the indicator 10 it is to be understood that conventional means can be employed to provide for snap action of bimetal element 22 to prevent arcing at the contacts 34 and 36. Also, a variable resistor (not shown) can be connected in series with the heater 32 to provide for factory calibration of the indicator 10. The support for element 12 can also be an adjustable support to allow for adjustment of the reference level.

In the disclosed embodiments, which are particularly adapted for use in the fuel oil supply business, the data supplied by the indicator 10 will accurately indicate to the fuel supply dealer the cumulative severity of external temperature conditions with respect to a reference temperature over desired time intervals, and because the severity of these external temperature conditions directly affects the fuel consumption of users, the fuel supplier can more accurately predict the needs of his customers without making unnecessary trips to his customers merely as a precautionary measure to avoid inadvertently allowing the fuel tanks to become empty.

Having thus described my invention, I claim:

1. Apparatus comprising first means responsive to a physical variable for exerting a force of a magnitude that is a function of the extent of the variation of said physical variable from a reference level, second means operably connected to said first means for exerting a force in opposition to the force exerted by said first means and responsive to a source of energy for increasing the magnitude of its opposition force, an energy-supply circuit, normally open switch means for said circuit which is closed in response to a resultant force of a preestablished value exerted by said first and second means, said energy supply circuit being operable when said switch means is closed to supply energy to said second means to reduce the magnitude of the resultant force at a rate which is proportional to the time the circuit is closed so as to open the circuit after a time-duration which is proportional to the force exerted by said first means, and motor means responsive in operation to closing of said switch means.

2. Apparatus according to claim 1, wherein said last-named means comprises structure connected to said energy-supply circuit for recording the time-integral of closing of said energy-supply circuit.

3. Apparatus according to claim 2, wherein said first means comprises a beamlike structure which undergoes flexure in response to variation of the physical variable.

4. Apparatus according to claim 1, wherein said second means comprises a temperature responsive bimetal element.

5. Apparatus according to claim 4, wherein said energy-supply circuit includes an electric heater in heat transfer relationship with said bimetal element, and said switch means includes a fixed contact and a contact carried by a movable portion of said bimetal element, and an electric power source in circuit with said heater and said contacts.

6. Apparatus according to claim 4, wherein ambient temperature compensation means are provided in association with said bimetal element.

References Cited
UNITED STATES PATENTS

| | | | |
|---|---|---|---|
| 2,668,445 | 2/1954 | Hidy | 73—339 |
| 2,821,837 | 2/1958 | McCorkle | 73—363.5 |
| 3,171,923 | 3/1965 | Broekhuysen | 73—363 |
| 3,301,058 | 1/1967 | Roberts | 73—339 |

DAVID SCHONBERG, *Primary Examiner.*

LOUIS R. PRINCE, *Examiner.*

NEIL B. SIEGEL, *Assistant Examiner.*